US00RE37006E

(19) United States
(12) Reissued Patent
Siracki et al.

(10) Patent Number: US RE37,006 E
(45) Date of Reissued Patent: Jan. 2, 2001

(54) HIGH FLOW WELD-IN NOZZLE SLEEVE FOR ROCK BITS

(75) Inventors: Michael A. Siracki, The Woodlands; James L. Larsen, Spring, both of TX (US)

(73) Assignee: Smith International, Inc., Houston, TX (US)

(21) Appl. No.: 09/120,819

(22) Filed: Jul. 22, 1998

Related U.S. Patent Documents

Reissue of:
(64) Patent No.: 5,538,093
Issued: Jul. 23, 1996
Appl. No.: 08/359,319
Filed: Dec. 5, 1994

(51) Int. Cl.[7] ..... E21B 10/60; E21B 10/46
(52) U.S. Cl. ..... 175/393; 175/424; 175/425
(58) Field of Search ..... 175/340, 393, 175/424, 425, 325.2

(56) References Cited

U.S. PATENT DOCUMENTS

| | | | | |
|---|---|---|---|---|
| 2,238,895 | * | 4/1941 | Gage | 175/340 X |
| 3,179,189 | * | 4/1965 | Goodwin | 175/340 |
| 3,220,754 | * | 11/1965 | Mori | 175/340 X |
| 3,823,789 | * | 7/1974 | Garner | 175/424 X |
| 3,915,246 | | 10/1975 | Sheshtawy | 175/317 |
| 4,068,731 | | 1/1978 | Garner et al. | 175/339 |
| 4,533,005 | * | 8/1985 | Morris | 175/424 X |
| 4,567,954 | * | 2/1986 | Voight, III et al. | 175/424 |
| 4,687,067 | * | 8/1987 | Smith et al. | 175/424 X |
| 4,759,415 | | 7/1988 | Pessier | 175/340 |
| 4,794,995 | * | 1/1989 | Matson et al. | 175/424 X |
| 5,072,796 | * | 12/1991 | Shen et al. | 175/340 |
| 5,494,122 | | 2/1996 | Larsen et al. | 175/340 |
| 5,853,055 | * | 12/1998 | Siracki et al. | 175/340 |

FOREIGN PATENT DOCUMENTS 2294073 4/1998 (GB) .

OTHER PUBLICATIONS

Webster's II New Riverside University Dictionary, 1984, The Riverside Publishing Co., pp. 425 and 851.*

* cited by examiner

*Primary Examiner*—Frank Tsay
(74) *Attorney, Agent, or Firm*—Conley, Rose & Tayon, P.C.

(57) ABSTRACT

A nozzle sleeve for the retention of replaceable fluid nozzles for rock bits is disclosed. The sleeve is secured within the body of the rock bit. A first upstream end of the sleeve communicates with a fluid plenum formed by the bit body. A second downstream end of this sleeve is adapted to receive the fluid nozzles. An elliptical fluid entrance is formed at the first upstream end of the nozzle sleeve. The elliptical fluid inlet formed by the sleeve serves to increase the flow of fluid to the nozzles, reduce turbulence of the fluid and substantially reduce the erosive effects associated with high fluid velocities and turbulent flow.

40 Claims, 4 Drawing Sheets

HIGH FLOW WELD-IN NOZZLE SLEEVE FOR ROCK BITS

Matter enclosed in heavy brackets [ ] appears in the original patent but forms no part of this reissue specification; matter printed in italics indicates the additions made by reissue.

CROSS REFERENCE TO RELATED APPLICATION

This application relates to a previously filed patent application Ser. No. 08/317,969, entitled COMPOSITE NOZZLES FOR ROCK BITS filed Oct. 4, 1994.

BACKGROUND OF THE INVENTION

1. Field of the Invention

This invention relates to replaceable nozzles for rock bits utilizing drilling fluid to remove detritus from an earthen formation borehole.

More particularly, this invention relates to weld-in sleeves utilized to secure replaceable nozzles in rock bit bodies. The sleeve provides a means to both minimize fluid erosion and assure a more uniform flow of drilling fluid contained within a plenum formed by the rock bit body to the nozzles.

2. Background

Replacement nozzles must have a means of being retained into rock bits. The more typical retention methods for securing nozzles are mechanical and are machined either directly into the bit body or into a sleeve that is in turn welded into bores formed in the rock bit body.

Weld-in nozzle sleeves have been used in rotary cone rock bits for several years for ease of manufacturing. An internal plenum interfaces with secured nozzles via a relatively narrow passage bore formed adjacent to the plenum, of which a portion of the passage way is included in the welded-in sleeve, if a sleeve is utilized.

Internal erosion, in and around nozzle bodies is a major problem. A loss of hydraulic pressure downhole results in a trip out of the borehole and often times the bit is replaced due to the extent of damage to the bit as a result of fluid erosion.

Internal erosion in a rock bit can typically be related to four parameters, mud weight, mud abrasiveness, flow velocity and geometrical discontinuities i.e. gaps, bend, comers and the like. The current nozzle retention configurations are limited in flow capacity by creating a high fluid velocity over a sharp comer formed in the bit adjacent the passage bore entrance. High flow rates cause the fluid flow to separate at the comer creating recirculation zones with sufficient energy to erode the surrounding metal surface that, as heretofore stated, has caused bit washout.

Another potential problem with the state of the art weld-in sleeve is gaps formed between the sleeve and the leg or bit body interface. Gaps may occur at this interface if correct manufacturing procedures are not followed. High fluid flow over gaps where the depth of the gap is much greater than the width will tend to cause recirculation zones within the gap with sufficient energy to erode the surrounding metal potentially leading to bit washout.

The present invention overcomes the above difficulties of the state of the art nozzle retention configurations by designing and securing the sleeve retention configurations in the rock bit body in a way to minimize the possibility of fluid erosion problems.

SUMMARY OF THE INVENTION

It is an object of this invention to provide a nozzle sleeve that will increase the fluid flow capacity through a nozzle.

It is another object of this invention to provide a nozzle sleeve that minimizes internal erosion problems that lead to nozzle washouts.

A nozzle sleeve for the retention of replaceable fluid nozzles for rock bits is disclosed. The sleeve is secured within the body of the rock bit. A first upstream end of the sleeve communicates with a fluid plenum formed by the bit body. A second downstream end of this sleeve is adapted to receive the fluid nozzles.

A streamlined fluid entrance is formed at the first upstream end of the nozzle sleeve. The streamlined entrance is generally rounded or elliptical. The rounded or elliptical fluid entrance is formed at the first upstream end of the nozzle sleeve. The rounded or elliptical entrance begins at an outer peripheral edge formed by the first upstream end of the sleeve and proceeds inwardly toward a straight bore section formed by the sleeve and positioned about intermediate the first and second ends of the sleeve. The rounded or elliptical fluid inlet formed by the sleeve serves to increase the flow capability of fluid to the nozzles by reducing separation of the fluid which substantially reduces the erosive effects associated with high fluid velocities.

The weld-in sleeve of the present invention increases the fluid flow capacity through a replaceable nozzle by increasing the entrance flow area and by reducing geometrical discontinuities into the jet nozzle.

One of the design approaches resulted in a sleeve with an upstream rounded or elliptical entrance that blends into a straight bore section that interfaces with the nozzle receptacle. The sleeve is intalled (welded) in a straight bore hole formed in the bit body that proceeds from an external surface of the leg forging into the internal jet bore plenum formed by the bit body.

The straight bore section of the nozzle sleeve may be shortened or lengthened to move an exit plane of the nozzle closer to or further from a borehole bottom to improve bottom hole cleaning.

An alternative approach is to provide an erosion resistant material that extends into the jet bore plenum to shield high fluid velocity areas from erosion. Still another alternative approach is to provide an erosion resistant material that is rounded or elliptical at the entrance to the weld-in sleeve that will resist erosion while providing increased fluid flow capacity to the nozzle.

It is an advantage then over the prior art to provide increased fluid flow to the nozzles by providing a weld-in sleeve with a rounded or elliptical fluid entrance to the nozzles.

It is yet another advantage over the prior art to provide a weld-in sleeve that may be shortened or lengthened to locate a nozzle exit plane closer to or further from a borehole bottom to enhance the removal of detritus from the borehole bottom.

The above noted objects mid advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
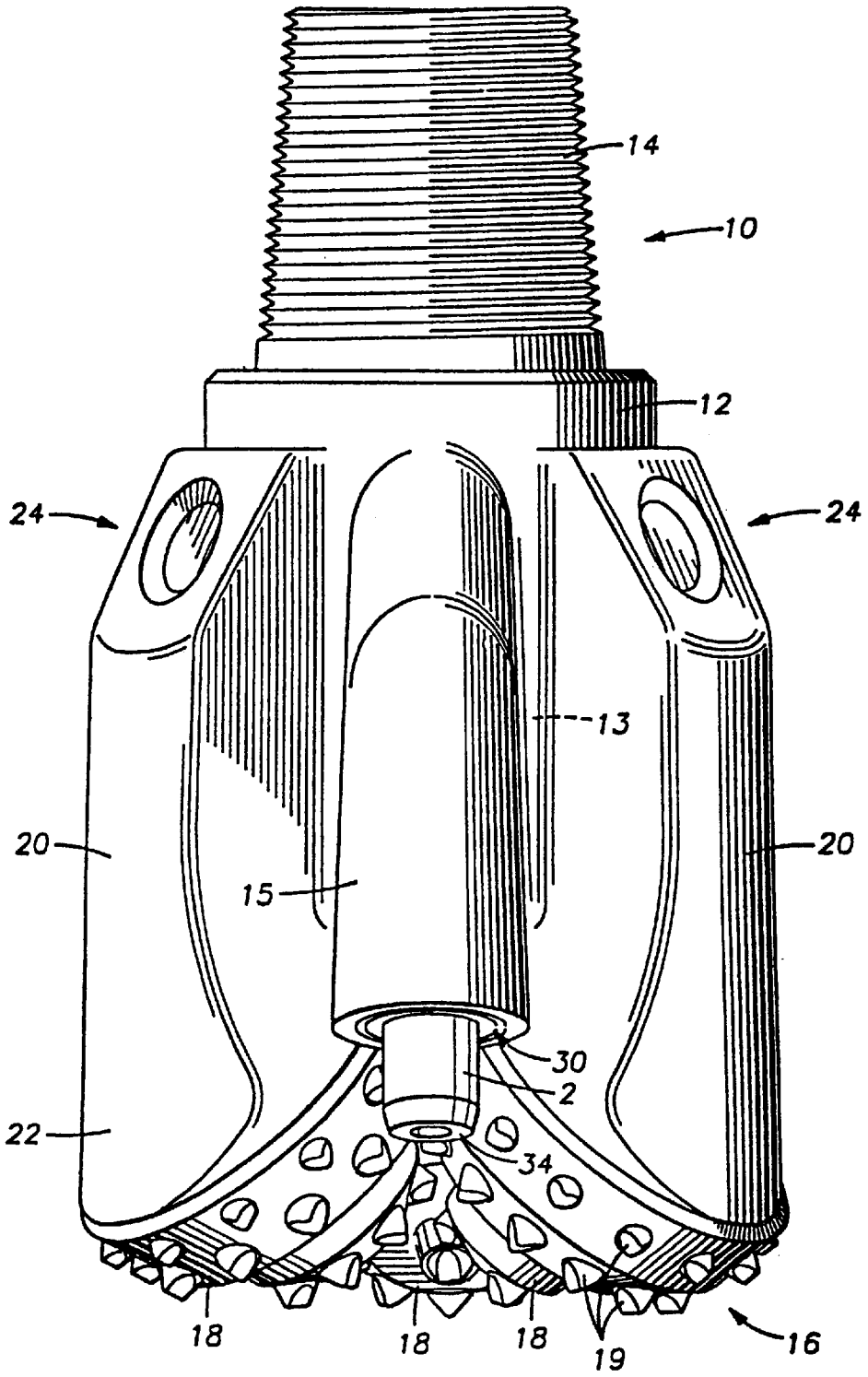
FIG. 1 is a perspective view of a rotary cone rock bit with emphasis on one of the fluid nozzles.
Figure 2:
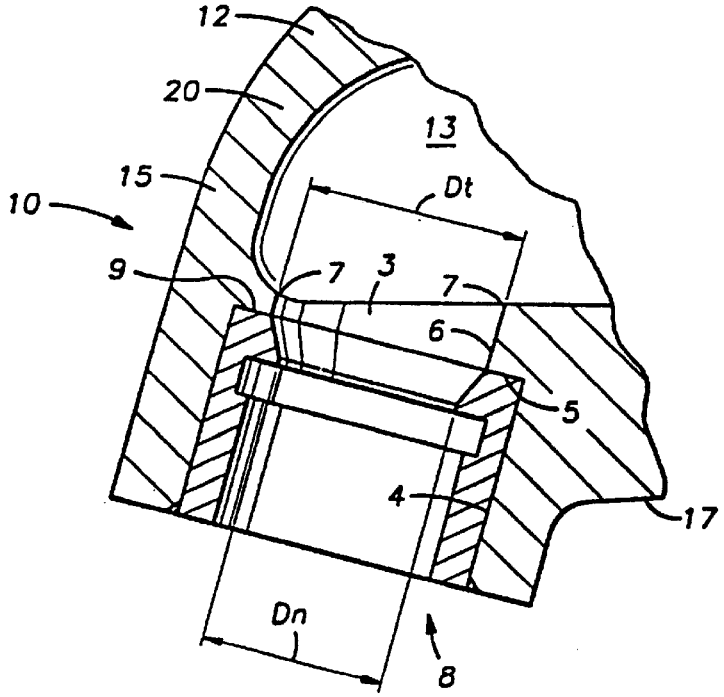
FIG. 2 (PRIOR ART)
FIG. 2 is a partially broken away cross-section of a prior art nozzle sleeve welded into a bit leg forging aperture.
Figure 3:
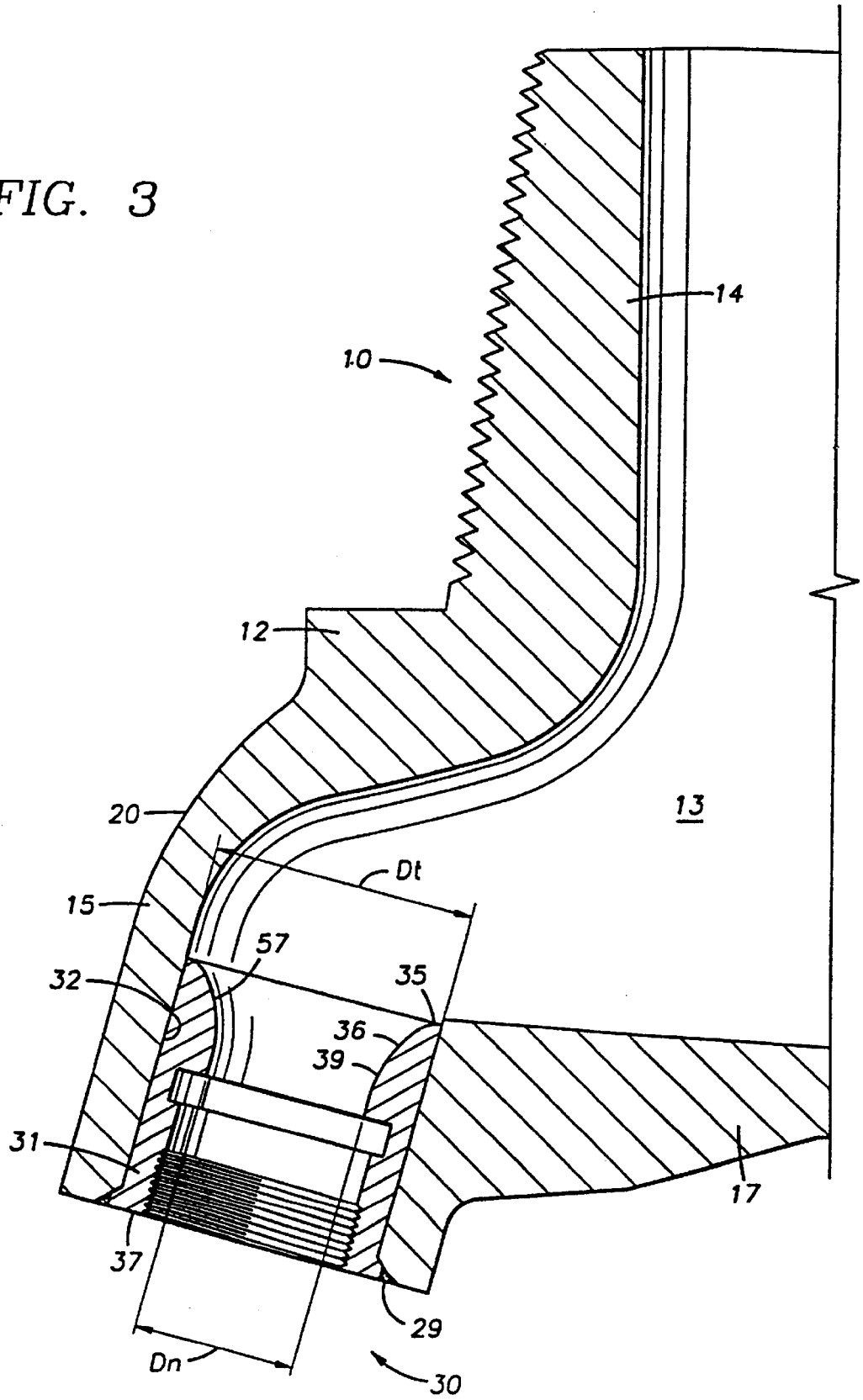
FIG. 3 is a cross-section of a nozzle sleeve of the present invention welded or mounted within a straight bore formed in a bit leg forging.

With reference to FIG. 1, the rotary cone rock bit generally designated as 10 consists of rock bit body 12, pin end 14 and a cutting end generally designated as 16. A fluid chamber or plenum 13 is formed within bit body 12. The plenum 13 communicates with the open pin end 14 so that hydraulic fluid (mud) may enter the rock bit body through an attached drill string (not shown). A dome 17 formed by the bit body defines a portion of the fluid plenum 13 (FIGS. 2 and 3). Rock bit legs 20 extend from the bit body 12 toward the cutting end 16 of the bit. A cutter cone 18 is rotatively secured to each leg 20 through a journal bearing extending into each cone from a shirtail 22 of the leg 20 (not shown).

Each cone 18, for example, has a multiplicity of cutter inserts 19 equidistantly spaced around each of the cones 18.

A lube reservoir system 24 supplies a lubricant to beating surfaces defined between the interior of the cones 18 and the journal.

A mini-extended nozzle generally designated as 2 is shown protruding from a nozzle retention sleeve generally designated as 30 (FIG. 3). The mini-extended nozzle is the subject of a related patent application entitled COMPOSITE NOZZLES FOR ROCK BITS filed Oct. 4, 1994 and assigned to the same assignee as the present invention. The foregoing patent application is hereby incorporated by reference.

The prior art of FIG. 2 depicts a counter bore aperture 3 formed in leg forging 20 that communicates with plenum 13. A straight bore 3 is drilled into plenum 13 followed by a counterbore 4 that terminates at shoulder 5 in nozzle retention body 15. The plenum entrance to straight bore 3 creates a sharp corner 7 as well as a reduced-in-area entrance to the standard nozzle sleeve generally designated as 8.

The reduced diameter entrance increases the mud flow velocities into the entrance to nozzle sleeve 8 thus accelerating any erosion that may occur.

Moreover, the sharp comers 7 creates fluid flow separation and high shear layer stresses as well as adding to the erosive capabilities of the fluid.

The current weld-in sleeve 8, for example, for a 12¼ inch bit ($D_1$=1.25, $D_n$=1.06) has a $A_t/A_n$ ratio of 1.39 where $$A_t = \pi\frac{D_t^2}{4} \text{ and } A_n = \pi\frac{D_n^2}{4}$$

while the new high flow sleeve 30 ($D_t$=1.75, $D_n$=1.06) has a [$D_t/D_n$] $A_t/A_n$ ratio of 2.73 (see FIG. 3).

Turning now to the preferred embodiment of FIG. 3, the new sleeve design generally designated as 30 lowers the entrance velocity by machining a larger straight bore hole 32 in the sleeve retaining body 15 formed by bit body 12 to the plenum 13. By manufacturing, for example, an elliptical shaped (36), high efficiency entrance (35) in the sleeve 30, the sleeve now takes full advantage of the larger straight bore 32 in bit body 12. Entrance 35 leads to elliptical contour 36 that tangents an internal straight bore 39 formed by sleeve body 31, entrance 35 and exit plane 37.

The sleeve, for example, is welded at the juncture 29 formed between the exit end 37 of the sleeve 30 and the straight bore opening in the sleeve retention body 15 of bit 10.

By reducing the entrance velocity by increasing the entrance diameter ($D_t$), higher mud fluid flow rates can be passed through the sleeve 30 without risk of erosion. The more desirable $A_t/A_n$ ratio of 2.73 corresponds to a reduced entrance fluid velocity of 50% over the current weld-in sleeve design (sleeve 8. FIG. 2), assuming $D_n$ is the same for both sleeves and equals 1.06".

The $A_t/A_n$ ratio for weld-in sleeves may range from 1.75 to 10 without departing from the teaching of this invention.

Furthermore, gap areas created by improper placement of the state of the art sleeves 8 during the weld-in process is eliminated. Since all interface gaps between the sleeve design 30 and the machined straight bore 32 in bit body 12 are located at relatively low fluid flow velocity areas (35), eddy current erosion is decidedly minimized.

It would be obvious to form elliptical entrance 36 into other shapes such as a quarter round without departing from the scope of this invention (not shown).

It would also be obvious to machine the entrance 25, the elliptical contour 36 and the internal straight bore 39 directly into the bit body 15 without departing from the scope of this invention (not shown).

Figure 4:
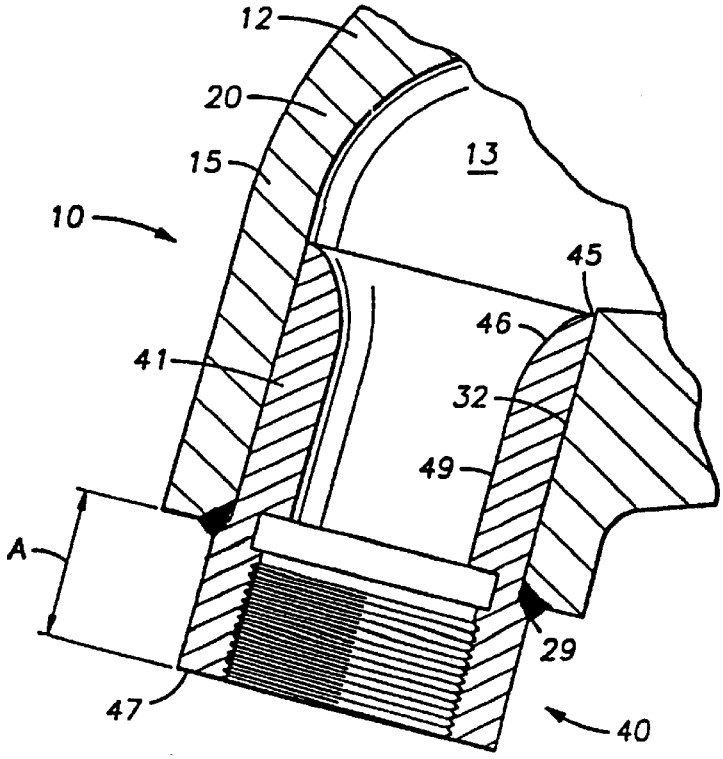
FIG. 4 is a cross-section of an extended nozzle sleeve of the present invention welded within a straight bore formed in a bit leg.

With reference now to FIG. 4, an alternative embodiment extended nozzle sleeve generally designated as 40 forms an entrance 45 that transitions into elliptical portion 46 that in turn tangents on internal straight bore 49 formed by sleeve body 41. The exit plane 47 may be extended distance 'A'; the length of the extension depending upon the desired distance the exit of the nozzle is with respect to a borehole bottom (not shown) to effect the best bottom hole cleaning by the nozzle 2 (FIG. 1).

The extended nozzle sleeve 40 is welded at the juncture 29 formed between the outer surface of the sleeve and the straight bore opening in the sleeve retention body 15.

Figure 5:
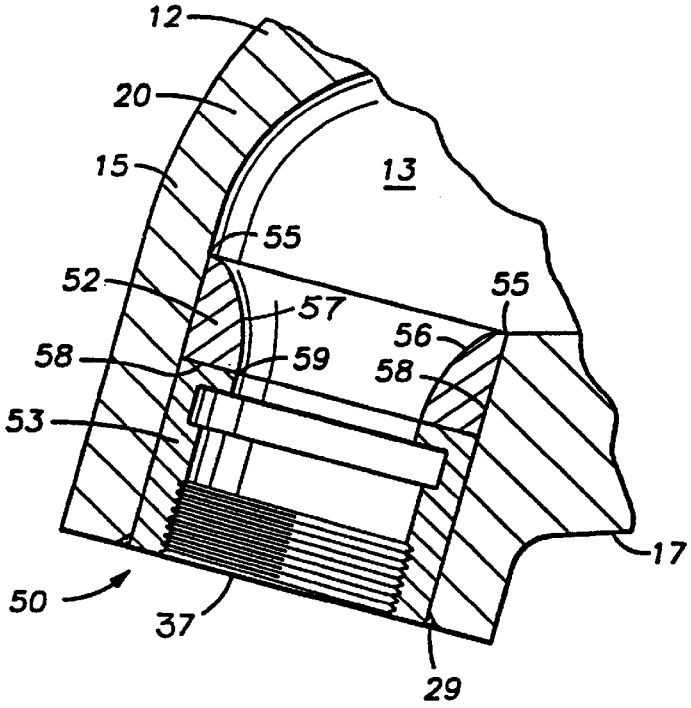
FIG. 5 is a cross-section of an alternative nozzle sleeve wherein a rounded inlet to the sleeve is formed from an erosion resistant metal.

Referring now to FIG. 5, another alternative embodiment of the nozzle sleeve generally designated as 50 is depicted wherein a erosion resistant segment 52 forms the upstream end surface of the nozzle sleeve 50. The erosion resistant segment 52 is preferably formed of tungsten carbide. Segment 52 forms entrance 55 that leads to elliptical contour 56 that tangents straight bore section 59 of sleeve body Typically the nozzle sleeve body 53 (as well as the nozzle sleeve bodies of FIGS. 2 thru 4) is fabricated from steel and the tungsten carbide is metalurgically bonded to the steel at interface 58.

An obvious means to join the carbide segment 52 to the steel sleeve is to braze the segment to the steel body 53.

The nozzle sleeve designs illustrated with respect to FIGS. 3 thru 5 adapts well to placing the nozzle receptacle closer to the formation borehole bottom while maintaining a robust design. The internal straight bore hole section (39, 49 and 59) can be increased or decreased in length during manufacturing to move the nozzle exit closer to the borehole bottom as shown in FIG. 4. This unique feature may be used to enhance bottom hole cleaning without using large carbide pieces (like mini-extended nozzles) or long cantilevered nozzles such as full extended nozzle tubes (not shown).

Figure 6:
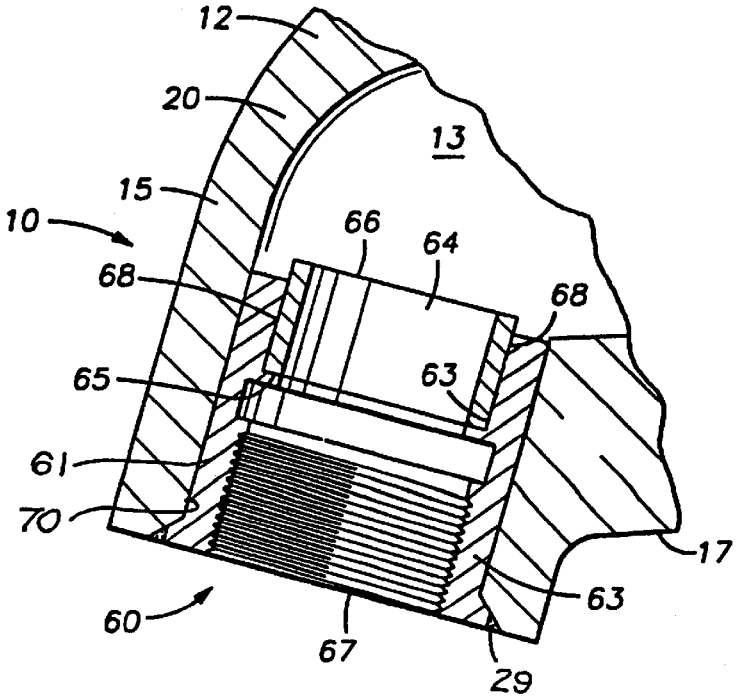
FIG. 6 is a cross-section of an alternative nozzle sleeve configuration wherein a wear and erosion resistant liner is positioned in an inlet orifice leading to the nozzle sleeve; an entrance to the liner extending into a plenum formed by the rock bit body.

A protective modification is depicted with respect to FIG. 6 wherein an erosion resistant extended liner or sleeve 64 is secured, for example, by brazing the liner at an interface 68 formed between the sleeve body 63 and the liner 64. The upstream end 66 of the liner 64 extends into the plenum 13 such that the drilling fluid is accelerated over the erosion resistant end 66 thus moving the increased flow away from the vulnerable steel rock bit components subject to erosion. End 65 of liner 64 is recessed in a groove 63 formed in upstream end 62 of nozzle sleeve 60. Again, the sleeve 60 is welded at juncture 29 formed between exit 67 of sleeve body 61 and the bore 70 in sleeve retention body 15 of bit 10.

It would be obvious to apply this present invention to flow passages in fixed cutter type rock bits (not shown) as well as roller cone rock bits.

It will of course be realized that various modifications can be made in the design and operation of the present invention without departing from the spirit thereof. Thus while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. [A] *A drill bit, comprising:*

*a drill bit body forming a fluid plenum in the interior of said drill bit body;*

*a plenum bore in fluid communication with said fluid plenum, said plenum bore having an entrance at said fluid plenum and defining a plenum bore entrance diameter;*

*a* nozzle [retention means] *retainer positioned in said plenum bore and* for the retention of replaceable fluid nozzles within the body of [a rock] *said drill* bit, *said nozzle retainer having a nozzle retainer outside diameter about equal to said plenum bore entrance diameter,* where a first upstream end of the nozzle [retention means] *retainer* communicates with [a] *said* fluid plenum formed by said bit body, *and* a second downstream end of the nozzle [retention means being] *retainer is* adapted to receive said fluid nozzles[, said nozzle retention means further comprising,] *;* a curved fluid entrance at said first upstream end of the nozzle [retention means] *retainer*, said curved entrance [begins] *beginning* at an outer peripheral edge formed by said first upstream end of said nozzle [retention means] *retainer* and [proceeds] *forming a fluid entrance diameter, said fluid entrance diameter being approximately equal to said nozzle retainer outside diameter, said curved entrance proceeding* inwardly toward a straight bore section of said nozzle [retention means] *retainer* positioned intermediate said first and second ends of the nozzle [retention means] *retainer*, the curved fluid inlet formed by the nozzle [retention means serves] *retainer serving* to increase the flow of fluid to the nozzles, reduce turbulence of the fluid and substantially reduce the erosive effects associated with high velocities and turbulent flow.

2. The invention as set forth in claim 1 wherein the curved fluid entrance at said first upstream end of said nozzle retention means is parabolic in shape.

3. The invention as set forth in claim 1 wherein the curved fluid entrance at said first upstream end of said nozzle retention means is elliptical in shape.

4. The invention as set forth in claim 1 wherein said nozzle retention means is a sleeve that is secured within the body of said rock bit.

5. The invention as set forth in claim 4 wherein the surface formed by the first streamlined upstream end of said sleeve in contact with a drilling fluid contained within said plenum is comprised of a material that is more wear and erosion resistant than a base nozzle sleeve material.

6. The invention as set forth in claim 5 wherein the surface material of said streamlined upstream end of said sleeve is tungsten carbide.

7. The invention as set forth in claim 6 wherein the base nozzle sleeve material is steel.

8. The invention as set forth in claim 1 wherein the curved fluid entrance at said first upstream end of said nozzle retention means is about one-quarter of a circle.

9. The invention as set forth in claim 1 wherein the ratio between the first upstream end and said straight bore section is from 1.75 to 10.0.

10. The invention as set forth in claim 1 wherein the nozzle retention means is machined directly within the body of said rock bit.

11. The invention as set forth in claim 1 wherein the nozzle retention means is formed within a sleeve that is extended beyond the rock bit body such that said replaceable nozzle may be positioned a desired distance from a borehole bottom for efficient removal of detritus from said borehole bottom.

12. [A] *A drill bit, comprising:*

*a drill bit body having a dome with an outer periphery, said dome defining a portion of a fluid plenum in the interior of said drill bit body;*

*a plenum bore in fluid communication with said fluid plenum and being located at said outer periphery of said dome, said plenum bore having a plenum bore entrance diameter at the transition from said fluid plenum to said plenum bore;*

*a* nozzle [retention means] *retainer located in said plenum bore and* for the retention of replaceable fluid nozzles within the body of [a rock] *said drill* bit, *said nozzle retainer having a nozzle retainer outside diameter about equal to said plenum bore entrance diameter,* where a first upstream end of said nozzle [rentention means] *retainer* is curved and communicates with a fluid plenum formed by said bit body, a second downstream end of said nozzle [retention means] *retainer* being adapted to receive said fluid nozzles, said nozzle [retention means] *retainer* further comprising, an area ratio between the first upstream end and the downstream end of 1.75 to 10.0.

13. The invention as set forth in claim 12 wherein said nozzle retention means is formed in a sleeve that is secured within the body of said rock bit.

14. The invention as set forth in claim 13 wherein a surface formed by the first upstream end of said sleeve is comprised of a material that is more wear and erosion resistant than a base nozzle sleeve material.

15. The invention as set forth in claim 14 wherein the surface material of said upstream end of said sleeve is tungsten carbide.

16. The invention as set forth in claim 15 wherein the base nozzle sleeve material is steel.

17. The invention as set forth in claim 12 wherein the nozzle retention means is machined directly within the body of said rock bit.

18. [A] *A drill bit comprising:*

*a drill bit body having a dome with an outer periphery, said dome defining a portion of a fluid plenum in the interior of said drill bit body;*

*a plenum bore in fluid communication with said fluid plenum and being located at said outer periphery of said dome, said plenum bore having a plenum bore entrance diameter at the transition from said fluid plenum to said plenum bore;*

*a* nozzle [retention means] *retainer* for the retention of replaceable fluid nozzles within the body of a [rock] *drill* bit, *said nozzle having a nozzle retainer diameter along the outer portion of said nozzle retainer, said nozzle retainer diameter and said plenum bore entrance diameter being approximately equal,* a first upstream end of said nozzle [retention means is] *retainer being* curved and communicates with [a] *said* fluid plenum [formed by said bit body], *and* a second downstream end of said nozzle [retention means] *retainer* being adapted to receive said fluid nozzles, said nozzle [retention means] *retainer* further comprising, said first upstream end of said nozzle [retention means] *retainer* is comprised of a material that is more wear and erosion resistant than a base bit body material.

19. The invention as set forth in claim 18 wherein the more wear and erosion resistant material of said upstream end of said nozzle retention means is tungsten carbide.

20. The invention as set forth in claim 18 wherein the nozzle retention means is formed in a sleeve where the wear and erosion resistant upstream end is secured to a base sleeve material.

*21. A drill bit, comprising:*

*a drill bit body having a dome with an outer periphery, said dome defining a portion of a fluid plenum in the interior of said drill bit body;*

*a plenum bore in fluid communication with said fluid plenum and being located at said outer periphery of said dome, said plenum bore having an entrance to said fluid plenum and defining a plenum bore entrance diameter at said entrance;*

*a nozzle retainer within said plenum bore, said nozzle retainer having a nozzle retainer diameter approximately equal to said plenum bore entrance diameter, said nozzle retainer being for the retention of replaceable fluid nozzles where a first upstream end of said nozzle retainer has an area $A_t$ and communicates with a fluid plenum formed by said bit body, a second downstream end of said nozzle retainer has an area $A_n$ and being adapted to receive said fluid nozzles, said nozzle retainer further comprising,*

*an area ratio between the first upstream end $A_t$ and the downstream end $A_n$ of 1.75 to 10.0.*

*22. The invention as set forth in claim 21 wherein the transition from the upstream end to the downstream end is positioned such that it is substantially within the body of the rock bit.*

*23. The invention as set forth in claim 22 wherein said nozzle retention means is formed in a sleeve that is secured within the body of said rock bit.*

*24. The invention as set forth in claim 23 wherein a surface formed by the first upstream end of said sleeve is comprised of a material that is more wear and erosion resistant than a base nozzle sleeve material.*

*25. The invention as set forth in claim 24 wherein the surface material of said upstream end of said sleeve is tungsten carbide.*

*26. The invention as set forth in claim 25 wherein the base nozzle sleeve material is steel.*

*27. The invention as set forth in claim 25 wherein the curved fluid entrance at said first upstream end of said nozzle retention means is parabolic in shape.*

*28. The invention as set forth in claim 25 wherein the curved fluid entrance at said first upstream end of said nozzle retention means is elliptical in shape.*

*29. The invention as set forth in claim 21 wherein the nozzle retention means is machined directly within the body of said rock bit.*

*30. A drill bit, comprising:*

*a drill bit body having a dome with an outer periphery, said dome defining a portion of a fluid plenum in the interior of said drill bit body;*

*a plenum bore in fluid communication with said fluid plenum and being located at said outer periphery of said dome, said plenum bore having an entrance to said fluid plenum and defining a plenum bore entrance diameter at said entrance;*

*a nozzle retainer having an outside diameter approximately equal to said plenum bore entrance diameter, said nozzle retainer being for the retention of replaceable fluid nozzles, wherein a first upstream end of said nozzle retainer communicates with a fluid plenum formed by said bit body, a second downstream end of said nozzle retainer being adapted to receive said fluid nozzles, said nozzle retainer further comprising,*

*said first upstream end of said nozzle retainer is comprised of a material that is more wear and erosion resistant than a base bit body material.*

*31. The invention as set forth in claim 30 wherein the more wear and erosion resistant material of said upstream end of said nozzle retention means is tungsten carbide.*

*32. The invention as set forth in claim 30 wherein the nozzle retention means is formed in a sleeve where the wear and erosion resistant upstream end is secured to a base sleeve material.*

*33. A drill bit, comprising:*

*a drill bit body having a dome with an outer periphery, said dome defining a portion of a fluid plenum in the interior of said drill bit body;*

*a plenum bore in fluid communication with said fluid plenum and being located at said outer periphery of said dome, said plenum bore having an entrance to said fluid plenum and defining a plenum bore entrance diameter at said entrance;*

*a nozzle retainer defining a nozzle retainer diameter at said nozzle retainer's outer portion, said nozzle retainer diameter being about the same as said diameter of said fluid passage, wherein said nozzle retainer is for the retention of replaceable fluid nozzles, where a first upstream end of the nozzle retainer communicates with a fluid plenum formed by said bit body, a second downstream end of the nozzle retainer being adapted to receive said fluid nozzles, said nozzle retainer further comprising,*

*a fluid entrance at said first upstream end of the nozzle retainer converging toward said second end of said nozzle retainer.*

*34. The invention as set forth in claim 33 wherein said nozzle retention means is a sleeve that is secured within the body of said rock bit.*

*35. The invention as set forth in claim 34 wherein the surface formed by the first upstream end of said sleeve is comprised of a material that is more wear resistant than a base nozzle sleeve material.*

*36. The drill bit of claim 33, wherein said fluid entrance at said first upstream end is curved and converges toward the second end of the nozzle to a straight bore section, said curved fluid entrance being positioned substantially within the body of said rock bit.*

*37. A drill bit, comprising:*

*a drill bit body having a dome with an outer periphery, said dome defining a portion of a fluid plenum in the interior of said drill bit body;*

*a plenum bore in fluid communication with said fluid plenum and being located at said outer periphery of said dome, said plenum bore having a plenum bore entrance diameter at the transition from said fluid plenum to said plenum bore;*

*a nozzle retainer having a nozzle retainer diameter about equal to said plenum bore entrance diameter and being for the retention of replaceable fluid nozzles in the drill bit, where a first upstream end of the nozzle retainer communicates with a fluid plenum formed by said bit body, a second downstream end of the nozzle retainer being adapted to received said fluid nozzles, said nozzle retainer further comprising,*

*a fluid entrance at said first upstream end of the nozzle retention mean, wherein said entrance converges toward said second downstream end, the fluid entrance being co-axial to the second downstream end of said nozzle retainer.*

*38. The drill bit of claim 37, wherein said fluid entrance at said first upstream end is curved, said curved entrance beginning adjacent to a peripheral edge formed by said first upstream end.*

*39. A drill bit, comprising:*

*a drill bit body forming a fluid plenum in the interior of said drill bit body;*

*a plenum bore in fluid communication with said fluid plenum and being located at said outer periphery of said dome, said plenum bore having a plenum bore entrance diameter at the transition from said fluid plenum to said plenum bore;*

*a nozzle retainer positioned in said plenum bore and for the retention of replaceable fluid nozzles within the body of said drill bit, said nozzle retainer having a nozzle retainer diameter about equal to said plenum bore entrance diameter, where a first upstream end of the nozzle retainer communicates with a fluid plenum formed by said bit body, a second downstream end of the nozzle retainer being adapted to received said fluid nozzles, said nozzle retainer further comprising,*

*a fluid entrance at said first upstream end of the nozzle retainer, wherein said entrance begins adjacent to a peripheral edge formed by said first upstream end of said nozzle retainer and proceeds inward toward the second downstream end of the nozzle retainer, said fluid entrance having a diameter approximately equal to said nozzle retainer diameter.*

*40. The drill bit of claim 39, wherein said fluid entrance at said first upstream end of said nozzle is curved.*

* * * * *